United States Patent
Akbari et al.

(10) Patent No.: US 12,504,546 B2
(45) Date of Patent: Dec. 23, 2025

(54) METHOD OF MEASURING IRRADIATION DOSE AT A PRODUCT LEVEL

(71) Applicant: Sartorius Stedim FMT S.A.S., Aubagne (FR)

(72) Inventors: Samin Akbari, Winchester, MA (US); Magali Barbaroux, La Destrousse (FR); Samuel Dorey, Le Beausset (FR); David Pollard, South Boston, MA (US)

(73) Assignee: Sartorius Stedim FMT, Aubagne (FR)

( * ) Notice: Subject to any disclaimer, the term of this patent is extended or adjusted under 35 U.S.C. 154(b) by 264 days.

(21) Appl. No.: 18/268,431

(22) PCT Filed: Dec. 21, 2021

(86) PCT No.: PCT/US2021/064559
§ 371 (c)(1),
(2) Date: Jun. 20, 2023

(87) PCT Pub. No.: WO2022/140352
PCT Pub. Date: Jun. 30, 2022

(65) Prior Publication Data
US 2024/0310532 A1   Sep. 19, 2024

Related U.S. Application Data

(60) Provisional application No. 63/128,389, filed on Dec. 21, 2020.

(51) Int. Cl.
| | | |
|---|---|---|
| G01T 1/02 | (2006.01) | |
| A61L 2/08 | (2006.01) | |
| A61L 2/26 | (2006.01) | |

(52) U.S. Cl.
CPC ............... *G01T 1/02* (2013.01); *A61L 2/081* (2013.01); *A61L 2/082* (2013.01); *A61L 2/087* (2013.01);
(Continued)

(58) Field of Classification Search
CPC . G01T 1/02; A61L 2/081; A61L 2/082; A61L 2/087; A61L 2/26; A61L 2202/14; A61L 2202/23; A61L 2/08
See application file for complete search history.

(56) References Cited

U.S. PATENT DOCUMENTS 6,157,028 A * 12/2000 Purtle .................. A61L 2/28
250/580
6,376,845 B1   4/2002 Purtle
(Continued)

FOREIGN PATENT DOCUMENTS

| | | |
|---|---|---|
| CN | 102426378 A | 4/2012 |
| DE | 102015116617 A1 | 3/2017 |

(Continued)

OTHER PUBLICATIONS

O. M. Sanusi, F. A. Ghaffar, A. Shamim, M. Vaseem, Y. Wang and L. Roy, "Development of a 2.45 GHz Antenna for Flexible Compact Radiation Dosimeter Tags," in IEEE Transactions on Antennas and Propagation, vol. 67, No. 8, pp. 5063-5072, Aug. 2019, (Year: 2019).*

(Continued)

*Primary Examiner* — David J Makiya
*Assistant Examiner* — Gisselle M Gutierrez
(74) *Attorney, Agent, or Firm* — Womble Bond Dickinson (US) LLP (57) ABSTRACT

A method of measuring a radiation dosage during irradiation includes disposing a first sensor in a first package with a first biocontainer and disposing a second sensor in a second package with a second biocontainer. The method further includes placing the first package and the second package in a container and irradiation the container including the first package and the second package. During or after irradiation, a first radiation dosage associated with the first biocontainer is measured with the first sensor and a second radiation (Continued)

dosage associated with the second biocontainer is measured with the second sensor.

20 Claims, 5 Drawing Sheets

(52) U.S. Cl.
CPC ............. *A61L 2/26* (2013.01); *A61L 2202/14* (2013.01); *A61L 2202/23* (2013.01)

(56) References Cited

U.S. PATENT DOCUMENTS

| | | | |
|---|---|---|---|
| 2002/0040968 | A1 | 4/2002 | Black et al. |
| 2009/0278685 | A1 | 11/2009 | Potyrailo et al. |
| 2010/0175393 | A1 | 7/2010 | Burke et al. |
| 2011/0003279 | A1 | 1/2011 | Patel |
| 2017/0030768 | A1 | 2/2017 | Dardona et al. |
| 2024/0307568 | A1* | 9/2024 | Akbari .................... A61L 2/081 |
| 2024/0310533 | A1* | 9/2024 | Akbari .................... G01T 1/241 |

FOREIGN PATENT DOCUMENTS

| | | | |
|---|---|---|---|
| WO | 1995011459 | A1 | 4/1995 |
| WO | 1997017595 | A1 | 5/1997 |
| WO | 2000037966 | A1 | 6/2000 |
| WO | 2004027417 | A1 | 4/2004 |
| WO | 2004095062 | A2 | 11/2004 |
| WO | 2005089402 | A2 | 9/2005 |
| WO | 2007018749 | A2 | 2/2007 |
| WO | 2009100192 | A1 | 8/2009 |
| WO | 2011126725 | A1 | 10/2011 |
| WO | 2012036570 | A1 | 3/2012 |
| WO | 2014086675 | A2 | 6/2014 |
| WO | 2016035060 | A1 | 3/2016 |
| WO | 2019034093 | A1 | 2/2019 |
| WO | 2020006377 | A1 | 1/2020 |
| WO | 2020009930 | A1 | 1/2020 |
| WO | 2020258282 | A1 | 12/2020 |

OTHER PUBLICATIONS

European Office Action for EP Application No. 21847602.6 issued Apr. 8, 2024, 10 pages.
Sanusi, O. M. et al., Development of a 2.45 GHz Antenna for Flexible Compact Radiation Dosimeter Tags, IEE Transactions of Antennas and Propagation, Aug. 2019, pp. 5063-5072, vol. 67, No. 8, 10 pages.
Application of Sterilization by Gamma Radiation for Single-Use Disposable Technologies in the Biopharaceutical Sector, Pharmaceutical Technology, May 1, 2012, vol. 2012 Supplement, Issue 3, 12 pages.
McHale, B. P., Low-Cost, Disposable Mems Radiation Detectors Using Gamma-Sensitive Polymers, Calhoun Institutional Archieve of the Naval Postgraduate School, Jun. 2020, pp. 1-100, 100 pages.
Mittal, A. et al., Diacetylene-Based Colorimetric Radiation Sensors for the Detection and Measurement of g Radiation during Blood Irradiation, ACS Omega, 2021, pp. 9482-9491, vol. 6, 10 pages.
Gaston et al., FTIR study of ageing of g-irradiated biopharmaceutical EVA based film, Polymer Degradation and Stability, Apr. 1, 2016, pp. 19-25, vol. 129, 7 pages.
Gaston et al., One year monitoring by FTIR of g-irradiated multilayer film PE/EVOH/PE, Radiation Physics and Chemistry, Mar. 26, 2016, pp. 115-121, vol. 125, 7 pages.
Gaston et al., Impact of g-irradiation, ageing and their interactions on multilayer films followed by AComDim, Analytica Chimica Acta, Jun. 2, 2017, pp. 11-23, vol. 981, 13 pages.
Dorey et al., XPS analysis of PE and EVA samples irradiated at different g-doses, Applied Surface Science, Sep. 21, 2017, pp. 966-972, vol. 427, 7 pages.
Audran et al., Degradation of g-irradiated polyethylene-ethylene vinyl alcoholpolyethylene multilayer films: An ESR study, Polymer Degradation and Stability, Nov. 2, 2015, pp. 169-179, vol. 122, 11 pages.
Dorey et al., Reconciliation of pH, conductivity, total organic carbon with carboxylic acids detected by ion chromatography in solution after contact with multilayer films after g-irradiation, European Journal of Pharmaceutical Sciences, Feb. 23, 2018, pp. 216-226, vol. 117, 11 pages.
Dorey et al., Generation of 02?Permeation Barrier during the Gamma-Irradiation of Polyethylene/Ethylene-Vinyl Alcohol/ Polyethylene Multilayer Film, Industrial & Engineering Chemistry Research, Jul. 16, 2019, pp. 14115-14123, vol. 58, 9 pages.
Dorey et al., Effect of gamma irradiation on the oxygen barrier properties of ethylene vinyl alcohol in ethyl-vinyl acetate/ethylene-vinyl alcohol/ ethyl-vinyl acetate multilayer film, Journal of Applied Polymer Science, Apr. 13, 2020, 8 pages.
Gaston et al., Evaluation of multilayer film stability by Raman spectroscopy after gamma-irradiation sterilization process, Vibrational Spectroscopy, Mar. 5, 2018, pp. 52-59, vol. 96, 8 pages.
Gaston et al., Monitoring of the discoloration on g-irradiated PE and EVA films to evaluate antioxidant stability, Journal of Applied Polymer Science, 2018, 8 pages.
Girard-Perier et al., Mapping the scientific research on the gamma irradiated polymers degradation (1975-2018), Radiation Physics and Chemistry, Nov. 12, 2019, vol. 168, 9 pages.
Harris et al., A Thin Plastic Radiation Dosimeter, International Journal of Applied Radiation and Isotopes, 1961, pp. 114-122, vol. 11, 9 pages.
Kojima et al., The Gamma-ray Response of Clear Polymethylmethacrylate Dosimeter Radix RN15. Applied Radiation and Isotopes, Mar. 23, 1992, pp. 1197-1202, vol. 43, 6 pages.
Dorey et al., Theoretical and Practical Considerations When Selecting Solvents for Use in Extractables Studies of Polymeric Contact Materials in Single-Use Systems Applied in the Production of Biopharmaceuticals, Industrial & Engineering Chemistry Research, Apr. 27, 2018, pp. 7077-7089, vol. 57, 13 pages.
Pahl et al. Development of a Standardized Extractables Approach for Single-Use Components, BioProcess International, Oct. 2018, pp. 3-11, 9 pages.
Judeikis et al., Free Radical Yields in Polytetrafluoroethylene as the Basis for a Radiation Dosimeter, Space and Missile System Organization Air Force System Command, Los Angeles Air Force Station, Feb. 1968, 41 pages.
Nguyen et al., The Ubiquitous Issue of Cross-Mass Transfer: Applications to Single-Use Systems, Molecules, 2019, vol. 24, 31 pages.
Dorey et al., Identification of chemical species created during g-irradiation of antioxidant used in polyethylene and polyethylene-co-vinyl acetate multilayer film, Journal of Applied Polymer Science, May 25, 2020, 20 pages.
Wormuth et al., Visible Particulate Matter in Single-Use Bags from Measurement to Prevention, BioProcess International, Apr. 2019, pp. 50-53, vol. 17, 4 pages.
Industrial Sterilization Process Optimization and Modality Changes, Association for the Advancement of Medical Instrumentation, 2020, 92 pages.
International Preliminary Report on Patentability for PCT/US2021/ 064557 issued Jun. 13, 2023, 10 pages.
Arshak et al., Portable Real-Time Gamma Radiation Dosimetry System Using MgO and CeO2 Thick Film Capacitors, University of Limerick, Jan. 1, 2015, pp. 137-142, 7 pages.
Pending U.S. Appl. No. 18/268,430, filed Jun. 20, 2023.
Pending U.S. Appl. No. 18/268,428, filed Jun. 20, 2023.
Sandle et al., Application of Sterilization by Gamma Radiation for Single-Use Disposable Technologies in the Biopharmaceutical Sector, Pharmaceutical Technology, May 1, 2012, vol. 36, 12 pages.
International Preliminary Report on Patentability for PCT/US2021/ 064558, issued Jun. 13, 2023, 12 pages.
International Preliminary Report on Patentability for PCT/US2021/ 064559, issued Jun. 13, 2023, 8 pages.

* cited by examiner

METHOD OF MEASURING IRRADIATION DOSE AT A PRODUCT LEVEL

CROSS-REFERENCE TO RELATED APPLICATION

This application is a national stage filing under 35 U.S.C. § 371 of International Patent Application No. PCT/US2021/064559, filed Dec. 21, 2021, the entire contents of which are hereby incorporated by reference.

BACKGROUND

1. Technical Field

The present disclosure relates to sterilization of products and, more specifically, to methods of measuring an irradiation dosage at a product level.

2. Discussion of Related Art

Traditionally, the preparation, storage, mixing, freezing, transportation, formulation, and filling of biopharmaceutical solutions used multiple-use containers that were sterilized before use. In recent years there has been a move from using these multiple-use containers to using single-use packages or biocontainers for preparation, storage, mixing, freezing, transportation, formulation, and filling of biopharmaceutical solutions. These single-use biocontainers include, but are not limited to, plastic bags, conduits, tubes, hoses, hubs, connectors, or vessels.

The use of single-use biocontainers eliminated the requirement for a laboratory or production facility to include a cleaning validation process to track, sterilize, inspect, and store multiple use containers before reuse. Thus, by moving to single-use biocontainers laboratories and production facilities may free up additional resources of a production facility or laboratory to focus on production or development. For example, single-use biocontainers may free up time or cost less than the cleaning validation process required for multiple-use containers. In addition, the move to single-use biocontainers may reduce the risk of contamination when compared to multiple-use containers. Single-use biocontainers have been adopted as biopharmaceutical manufactures face increased pressure for cost savings while maintaining high quality products.

These single-use biocontainers are sterilized by the manufacturer before being distributed for use. The sterilization is achievable through ionizing irradiations as γ-rays, e-beam, X-rays that penetrate through parts, plastic or metallic parts, to sterilize the parts by killing microorganisms on or within the parts.

To sterilize a single-use biocontainer before use, single-use biocontainers are placed on a pallet or in a large container (e.g., a tote, a carrier, or a conveyor) with a plurality of other single-use biocontainers and moved around a stationary radiation source. The single-use biocontainers may be inside a package or carton before being placed on the pallet or the large container. To verify that a single-use biocontainer was exposed to radiation, an indicator tag, e.g., paper tag, that changes color when exposed to irradiation may be attached to a package or carton containing one or more single-use biocontainers. These indicator tags are sufficient to indicate that the package or carton was exposed to radiation but do not measure a dose of radiation absorbed by the products within the package or carton.

The dose of radiation can be measured by a radiation dosimeter. A radiation dosimeter is a device that when irradiated, exhibits a quantifiable change in some property of the radiation dosimeter which can be related to an absorbed dose in a given material. Some large containers or pallets used for sterilization of single-use biocontainers may include one or two radiation dosimeters at locations on the outer periphery of the large container or pallet. It is known there is significant variation in the radiation dose across the container and consequently, the biocontainers enclosed therein.

SUMMARY

The increasing adoption of single-use biocontainers in more critical applications, such as storage of products, highlighted the impact interactions between polymeric materials between the single-use biocontainers and the products within the single-use biocontainers. These interactions have become problematic for the stability of products within the single-use biocontainers. While the fact that interactions were occurring was apparent, the source of the problem was difficult to identify.

As detailed herein, in addition to sterilization, the irradiation of plastic parts can initiate chemical reactions and complex modifications inside the plastic material as well as modifications of the additives of the plastic. The chemical reactions or modifications can cause damage to the plastics themselves. All modifications do not happen at the same dose or to the same extent. Any changes in the received dose by the biocontainers may affect one or different critical quality attribute(s) of the plastics and may affect products stored in or transported through the biocontainers including, but not limited to, Active Pharmaceutical Ingredients (API) (e.g. a protein of interest), Bulk Drug Substances (BDS), or intermediate ingredients.

In addition, large containers may include multiple types of biocontainer(s) formed of different materials that are disposed within the container. As the prior art containers may only include one or two radiation dose sensors, it may be difficult to determine the dose absorbed by a particular single-use biocontainer within the container. Thus, a separate radiation dose sensor can be associated with each biocontainer or each type or biocontainer in the container such that a measurement of absorbed radiation of each biocontainer or type of biocontainer in the container can be accurately measured. Measuring a radiation dose on each biocontainer and/or each type of biocontainer within the container may allow for more accurate measurement of the effect of radiation on the biocontainers. The radiation dose of each biocontainer may be used to predict the impact of the sterilization on the products stored or transported through the biocontainers. The impact of the sterilization may be used to predict the degradation of products transported through or stored in the biocontainers.

In an embodiment of the present disclosure, a method of sterilizing biocontainers including irradiating a first biocontainer and measuring a first radiation dose received by the first biocontainer. The method also includes calculating a first ageing time of the first biocontainer after irradiation based on the first radiation dose received by the first biocontainer and preventing use of the first biocontainer before the first ageing time has elapsed.

In an embodiment of the present disclosure, a method of measuring a radiation dose during irradiation includes disposing a first sensor in a first package with a first biocontainer and disposing a second sensor in a second package with a second biocontainer. The method further includes placing the first package and the second package in a container and irradiation the container including the first package and the second package. During or after irradiation, a first radiation dose associated with the first biocontainer is measured with the first sensor and a second radiation dose associated with the second biocontainer is measured with the second sensor.

In another embodiment of the present disclosure, a method of sterilizing biocontainers includes irradiating a first biocontainer, measuring a first radiation dose received by the first biocontainer, calculating a first ageing time of the first biocontainer after irradiation based on the first radiation dose received by the first biocontainer, and preventing use of the first biocontainer before the first ageing time has elapsed.

In embodiments, the method includes irradiating a second biocontainer simultaneously with the first biocontainer, measuring a second radiation dose received by the second biocontainer, calculating a second ageing time of the second biocontainer after irradiation based on the second radiation dose received by the second biocontainer, and preventing use of the second biocontainer before the second ageing time has elapsed. The second ageing time may be different from the first ageing time. Calculating the second ageing time may include the second radiation dose being greater than the first radiation dose and the second ageing time being calculated to be less than the first ageing time.

In some embodiments, calculating the first ageing time is based on the first radiation dose and the material forming the first biocontainer. Measuring the first radiation dose received by the first biocontainer may include measuring the first radiation dose with a first sensor comprising a film formed of a material similar to the material forming the first biocontainer. Measuring the first radiation dose with the first sensor may include measuring a property of the film.

In certain embodiments, the method includes determining a shelf life of a product stored within the first biocontainer. Determining the shelf life of a product stored within the first biocontainer may comprise determining a quality of the first biocontainer based on a measurement of the first sensor taken after the ageing time and before the first biocontainer is filled with the product. Determining the shelf life of a product stored within the first biocontainer may include determining a quality of the first biocontainer and the product based on a measurement of the first sensor taken after the first biocontainer is filled with the product. Determining the shelf life of a product stored within the first biocontainer may include determining a quality of the product before the first biocontainer is filled with the product.

In another embodiment of the present disclosure, a method of sterilizing biocontainers includes simultaneously irradiating a plurality of biocontainers, measuring a distinct radiation dose for each of the biocontainers with a plurality of sensors, calculating a distinct ageing time for each biocontainer of the plurality of biocontainers after irradiation based on the distinct radiation dose received by the respective biocontainer, preventing use of a first biocontainer of the plurality of biocontainers based on a first ageing time of the first biocontainer and preventing use of a second biocontainer of the plurality of biocontainers based on a second ageing time of the second biocontainer. The second ageing time being different from the first ageing time. Each sensor of the plurality of sensors is associated with a biocontainer of the plurality of biocontainers.

In embodiments, calculating the second ageing time includes the second radiation dose being greater than the first radiation dose and the second ageing time being calculated to be less than the first ageing time. Calculating the first ageing time may be based on the first radiation dose and the material forming the first biocontainer.

In some embodiments, measuring the first radiation dose received by the first biocontainer includes mearing the first radiation dose with a first sensor of the plurality of sensors comprising a first film formed of a material similar to a material forming the first biocontainer. Measuring the first radiation dose with the first sensor may include measuring a property of the film. Measuring the second radiation dose received by the second biocontainer may include measuring the second radiation dose with a second sensor of the plurality of sensors comprising a second film formed of a material similar to a material forming the second biocontainer. The second film may be different from the first film.

In certain embodiments, the method includes determining a shelf life of a product stored within the first biocontainer. Determining the shelf life of a product stored within the first biocontainer may include determining a quality of the first biocontainer based on a measurement of the first sensor of the plurality of sensors taken after the first ageing time and before the first biocontainer is filled with the product. Determining the shelf life of a product stored within the first biocontainer may include determining the quality of the first biocontainer and the product based on a measurement of the first sensor taken after the first biocontainer is filled with the product. Determining the shelf life of a product stored within the first biocontainer may include determining a quality of the product before the first biocontainer is filled with the product.

In another embodiment of the present disclosure, a method of measuring a radiation dosage includes disposing a first sensor in a first package with a first biocontainer, disposing a second sensor in a second package with a second biocontainer, placing the first package and the second package in a container, irradiating the container including the first package and the second package, and measuring a first radiation dosage associated with the first biocontainer with the first sensor and a second radiation dosage associated with the second biocontainer with the second sensor.

In embodiments, measuring the first radiation dosage and the second radiation dosage includes the first radiation dosage being different from the second radiation dosage. Disposing the first sensor in a first package may include disposing the first sensor in the first package with the first biocontainer and a third biocontainer such that the first sensor is associated with the first biocontainer and the third biocontainer.

In some embodiments, placing the first package and the second package in a container includes placing the first package and the second package on a pallet.

In certain embodiments, irradiating the container includes the first package and the second package comprises exposing the container to a first cycle of radiation and a second cycle of radiation. Measuring the first radiation dosage may occur between the first cycle of radiation and the second cycle of radiation.

In another embodiment of the present disclosure, a method of measuring a radiation dosage includes placing a plurality of packages in a container with each package of the plurality of packages including a sensor associated with a biocontainer disposed within the package, irradiating the container including the plurality of packages, and measuring a radiation dosage of each package with the sensor associated with the biocontainer disposed within the respective package.

In embodiments, placing the plurality of packages in the container includes placing the plurality of packages on a pallet. Placing the plurality of packages in the container includes the sensor associated with the biocontainer includes at least one package of the plurality of packages comprising a first sensor associated with a first biocontainer and a second sensor associated with a second biocontainer.

In some embodiments, placing the plurality of packages in the container includes the sensor associated with the biocontainer including at least one package of the plurality of packages having the sensor associated with a first biocontainer and a second biocontainer disposed within the at least one package. Irradiating the container may include the plurality of packages comprises exposing the container to a first cycle of radiation and a second cycle of radiation. Measuring the radiation dosage may occur between the first cycle of radiation and the second cycle of radiation.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments, and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Figure 1:
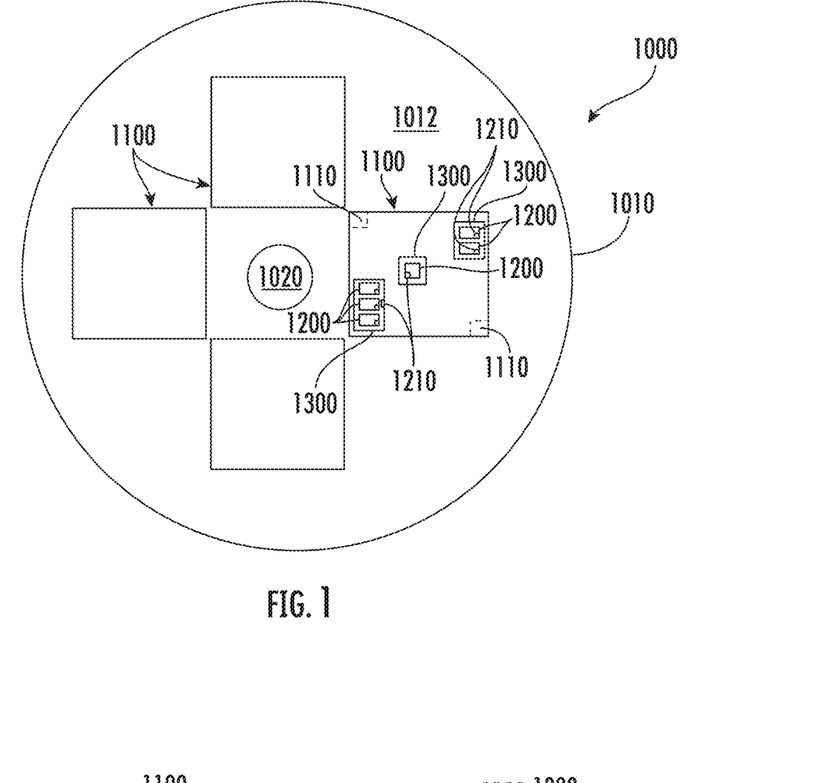
FIG. 1 is a top schematic view of a sterilization apparatus for biocontainers.
Figure 2:
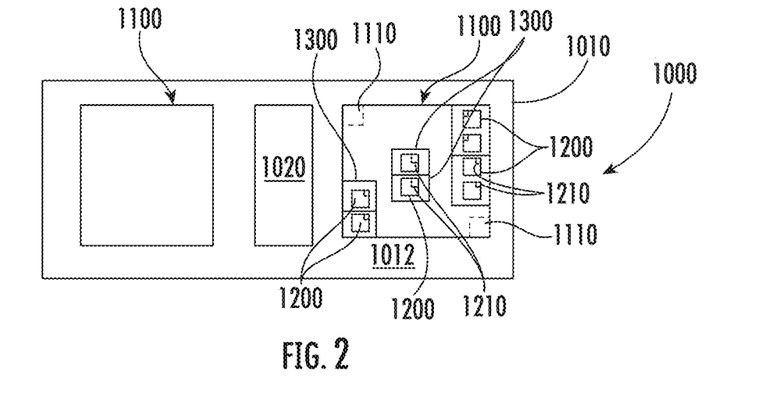
FIG. 2 is a side schematic view of the sterilization apparatus of FIG. 1.

Referring now to FIGS. 1 and 2, an apparatus for sterilization of biocontainers is illustrated and generally referred to as apparatus 1000. The apparatus 1000 includes an outer wall 1010 and a radiation source 1020. The outer wall 1010 encapsulates a chamber 1012 and shields an environment outside of the apparatus 1000 from radiation provided by the radiation source 1020.

To sterilize biocontainers, biocontainers 1200 can be loaded into one or more containers 1100. The containers 1100 are positioned within the chamber 1012 with one or more radiation sensors 1110 disposed within the container 1100. The radiation source 1020 is then placed in an irradiation configuration or activated to emit radiation in the form of γ-rays, e-beam, X-rays, or other form of sterilizing radiation. The radiation passes through the containers 1100 and the biocontainers 1200 to sterilize the materials forming the biocontainers 1200. The radiation sensors 1110 measure a dose of radiation at the locations within the container 1100. It is known that the radiation within the containers 1100 may vary greatly depending on the location of the biocontainer 1200 within the container 1100 and the other biocontainers 1200 within the container 1100. In addition, the material forming one biocontainer 1200 may differ from the material forming another biocontainer 1200. This variation in materials may also affect the dose deposition of radiation absorbed by the different biocontainers 1200. It has been shown that the dose of radiation absorbed during sterilization can affect the performance of the biocontainers 1200. In some embodiments, biocontainers 1200 can be placed on a conveyor that passes by the radiation source 1020.

Figure 3:
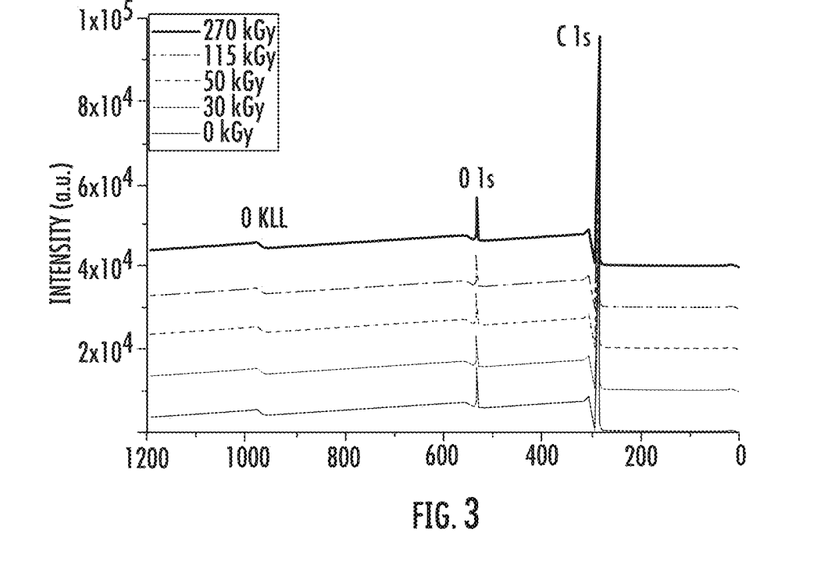
FIG. 3 is a chart illustrating the XPS spectra of EVA film at different absorbed doses of radiation.

With reference to FIG. 3, the effect of gamma irradiation multilayer films like those used to form single-use biocontainers have been studied using various techniques including, but not limited to, FTIR spectroscopy and X-Ray Photoelectron Spectroscopy. These studies have shown that as a result of irradiation, materials forming the multilayer films experience chemical modifications, show oxidation of the polymers, and the generation of oxidized species within and on the surface of the polymers. This generation of oxidized species may result in the generation of free radicals and thus, modification of the polymers. These free radicals can induce protein aggregation and protein oxidation of products within the single-use biocontainers. As shown in FIG. 3, the oxidation is dependent on the dose of radiation absorbed by the polymers.

Figure 4:
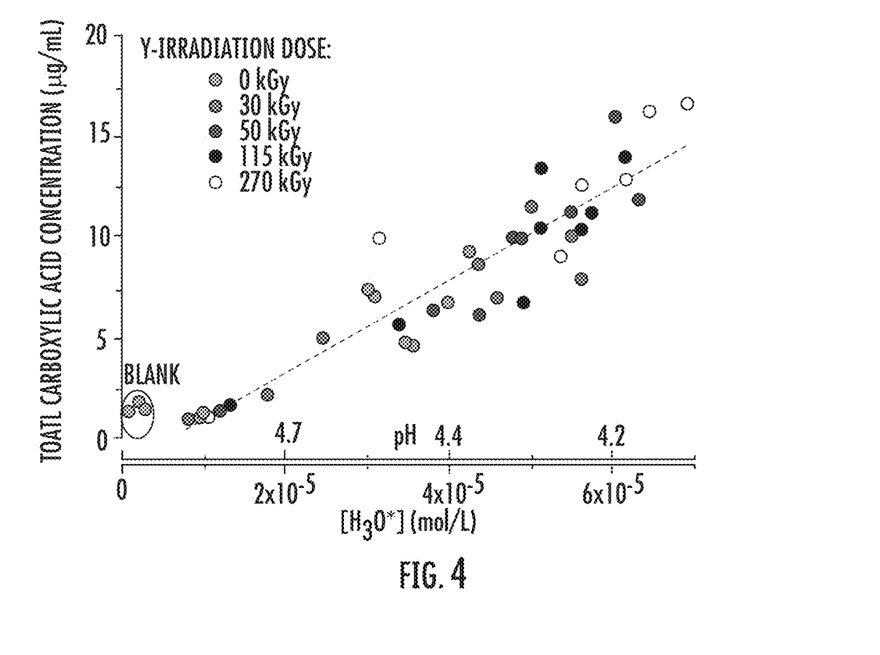
FIG. 4 is a chart illustrating carboxylic acids vs. $H_3O^+$ and pH.

The radiation dose may have an effect on the products stored within a single-use biocontainer after irradiation. The effects can be a decrease in concentration of a protein in the product, the change of buffer components' concentration in the product due to absorption, migration of radicals from the single-use biocontainer to the product, or a pH shift in the product within the single-use biocontainer. All of these effects may cause protein aggregation, chemical modification, or introduction of undesirable leachable compounds into the product. As shown in FIG. 4, a concentration of carboxylic acid within a single-use biocontainer is shown in response to varying radiation doses.

Figure 5:
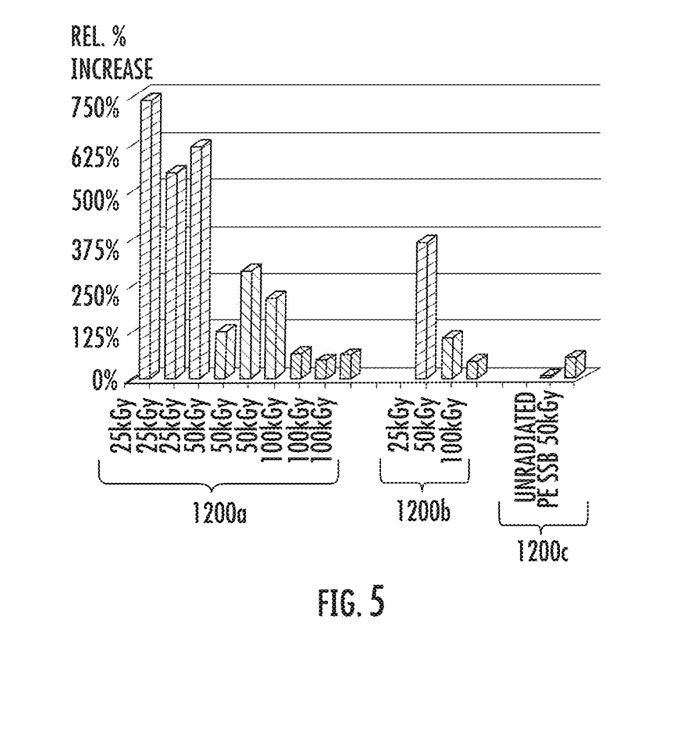
FIG. 5 is a chart showing empirical data of an increase in oxidation of a product in plastic bags which has been exposed to varying doses of radiation.

Referring to FIG. 5, it has been shown that after sterilization, an amount of amino-acid oxidation in the biocontainers 1200 can be affected by the dose of radiation received during sterilization. As shown, when a particular biocontainer receives an increased radiation dose, the amount of amino-acid oxidation decreases as the amount of the radiation dose increases. For example, when a particular biocontainer 1200a receives 25 KiloGray (kGy), there is 500% to 750% increase in amino-acid oxidation; when 50 kGy is received, there is a 120% to 275% in amino-acid oxidation; and when 100 kGy is received, there is less than a 100% increase in amino-acid oxidation. This is confirmed with another biocontainer 1200b having a 350% increase when exposed to 25 kGy, a 100% increase when exposed to 50 kGy, and 50% increase when exposed to 100 kGy. This is contrary to the accepted thought that the higher the dose of radiation the more damage would be done to the material and thus, the oxidation of amino-acids would be increased. Specifically, conventional thought was that the higher the dose of radiation, the more damage, e.g., oxidation and creation of free radicals, would occur; however, this is contrary to what is shown in FIG. 5 where the lower the radiation dose, the more amino-acid oxidation occurs in the single-use biocontainers.

Further, FIG. 5 also shows that the material forming the biocontainer may affect the dose on the biocontainer. For example, the first biocontainer 1200a was affected to a greater extent than the second biocontainer 1200b and that a third biocontainer 1200c was affected less than the second biocontainer 1200b. Thus, the effect of the dose may be dependent on the amount of the dose and the type of material receiving the dose.

One explanation of the increase in amino-acid oxidation is that the increased oxidations may be the result of free radicals being created as a result of the irradiation of the biocontainers. Specifically, radiation-sterilization of biocontainers may cause complex modifications inside the materials, leading to modifications of the additives or to damage in the polymers themselves. For example, irradiation of biocontainers may initiate chemical reactions inside the plastic material leading to either an increase or a decrease in the molecular weight of the polymers. These modifications may induce the formation of radical species at the surface and in the core of the material. The radical species can be generated despite the presence of antioxidants in the films as the radical species should be quickly scavenged by the antioxidants present within the materials. The presence of free radical species in the materials of biocontainers after irradiation has been shown with Electron Spin Resonance (ESR). Competition between the free radical scavenging by antioxidants and the reaction of oxidation with the hydrocarbon chains may result in the presence of oxygen containing organic molecules. This competition may depend on the γ-irradiation dose rate. It is contemplated that the direct availability of oxygen and antioxidants may also affect this competition.

Figure 6:
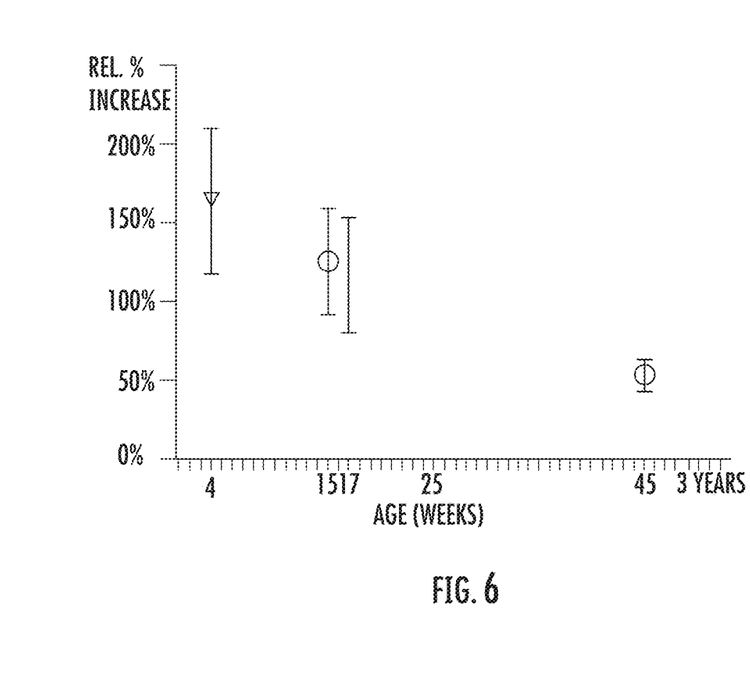
FIG. 6 is a chart showing empirical data of an increase in oxidation of a product in plastic bags at intervals of storage after sterilization.

Referring now to FIG. 6, the passage of time from the irradiation may reduce an amount of protein oxidation for the materials of the single-use biocontainers. The decrease in protein oxidation may be the result of free radicals dissipating after being created during irradiation. As shown in FIG. 6, for a biocontainer 1200, the relative increase in protein oxidation may be in a range of 125% to 225% after 4 weeks, with a decline to 90% to 165% after 15 weeks, a decline to 80% to 150% after 17 weeks, and a reduction to 50% after 45 weeks. Thus, the amount of time after irradiation can be significant in reducing the oxidation of proteins eventually stored in the biocontainers. This amount of time may be characterized as ageing time.

In view of the foregoing, it is clear that there are several factors that contribute to the potential for the single-use biocontainers to affect products that are stored within or flow through the single-use biocontainers. This potential to affect products stored within or flowing through the single-use biocontainers may be characterized by the protein oxidation within the single-use biocontainers. From the studies summarized above, the material of the single-use biocontainer, the radiation dose, and the ageing time of the single-use biocontainer after irradiation can be used to predict the protein oxidation within the single-use biocontainers. Accordingly, if the material of the single-use biocontainer and the radiation dose is known, then an appropriate ageing time or ageing time can be calculated to reduce or eliminate the effects of irradiation of the single-use biocontainers.

As detailed above, one factor for determining the effect of irradiation of a biocontainer is the dose of radiation received by each biocontainer. For this reason, there is a need for a method of accurately determine the dose of radiation received by each single-use biocontainer. A dose sensor that accurately measures a dose of a particular biocontainer may allow for improved prediction of the performance of the biocontainer after sterilization.

It is known that a type I or type II dosimeter can be used to measure a radiation dose absorbed by a single-use biocontainer during irradiation. With respect to type I dosimeter, the response of type I dosimeters must be adjustable for the effects of relevant influence quantities (temperature, dose rate, etc.) by applying independent corrections. Type I dosimeters may utilize the Fricke solution which uses spectrophotometric evaluation such as an alanine dosimeter with electron paramagnetic resonance (EPR) analysis, the dichromate solution with spectrophotometric evaluation, the ceric-cerous solution with either spectrophotometry or potentiometry, or the ethanol-chlorobenzene solution with titration analysis to determine the radiation dose absorbed during radiation. Independent correction factors are not practical with type II dosimeters due to the influence of factors related to the radiation dose including temperature and dose rate. For this reason, type II dosimeters include process calorimeters, cellulose triacetate, lithium fluoride containing polymer matrix (photofluorescent), Perspex systems, and radiochromic films and liquids. In addition, the correction process for type I and type II requires waiting several hours after radiating the sensors using UV-VIS, FTIR, or spectrometry equipment making it impossible to detect dose changes in real-time.

The dosimeters may allow for real-time measurement of a radiation absorbed during sterilization and the effect of the radiation on the material of a particular biocontainer. The dosimeters may allow for prediction of a decrease in concentration of protein or other formulation buffer components due to absorption, migration of free radicals from the biocontainers to products within that may cause a potential pH shift within the products which result from protein aggregation, chemical modification, or introduction of leachable compounds within the materials forming the biocontainers. The dosimeters and methods disclosed herein allow for radiation dose readings at the level of each biocontainer within the container as opposed to the container level of previous sensors detailed above, e.g., sensor 1110 (FIG. 1). As used herein, the term "package" describes a shipping package of one or more biocontainers. A package may be a cardboard box or a plastic tote that acts as a shipping unit for one or more biocontainers. A package may be referred to as a case.

In addition, the radiation dose sensors detailed herein may be suitable in a wide range of radiation doses, e.g., in a range of 10 Gy to 150 kGy, and a wide range of radiation energies and wavelengths, e.g., 100 keV to 10 MeV. Further, the radiation dose sensors detailed herein may account for environmental factors and must work in all irradiation factors including, but not limited to, as temperature, dose rate, percent of dose absorbed per hour, Grays per hour, and radiation type.

Figure 7:
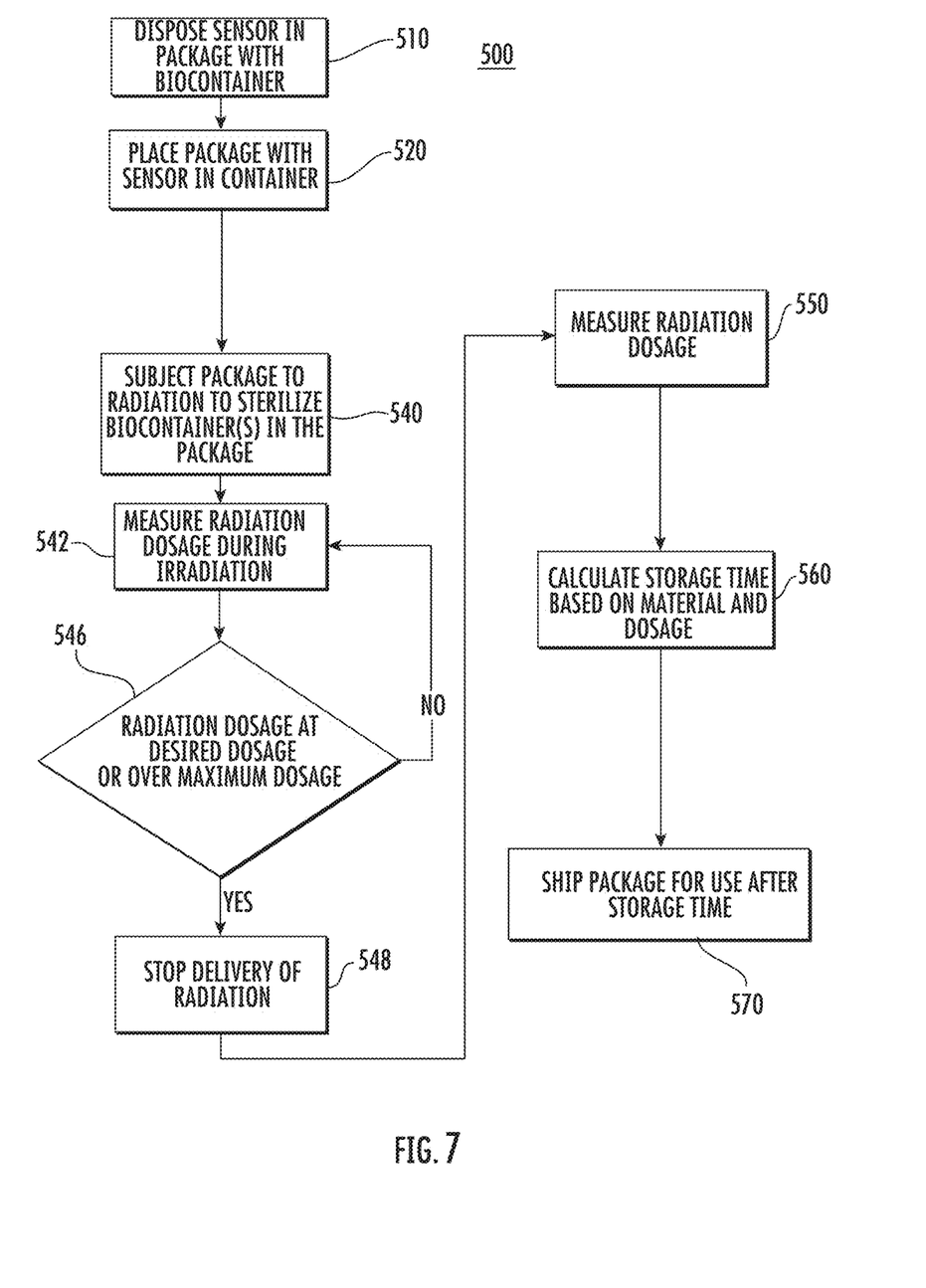
FIG. 7 is a flow chart of a method of determining a radiation dose of a biocontainer in accordance with embodiments of the present disclosure.

Referring now to FIG. 7, a method 500 of measuring an irradiation dose and the modification or damage to a material of a biocontainer is disclosed in accordance with the present disclosure with reference to the sterilization apparatus 1000 of FIGS. 1 and 2. With respect to method 500, a dosimeter or sensor 1210 may be a sensor disposed in a package 1300 with or on a biocontainer or may be a sensor disposed in a package 1300 with one or more biocontainers.

To begin measuring the dose of radiation of one or more biocontainers 1200 during irradiation thereof, a sensor 1210 is disposed on or in a package 1300 with a biocontainer 1200 or is disposed in a package 1300 with one or more biocontainers 1200 (Step 510). A single package 1300 may include multiple biocontainers 1200 with each biocontainer 1200 including a separate sensor 1210 or may include a single sensor 1210 associated with multiple biocontainers 1200 within the package 1300. It will be appreciated that each package 1300 is relatively small such that a single sensor 1210 disposed therein is capable of accurately measuring a radiation dose of each of the biocontainers 1200 therein. With the sensors 1210 disposed in the packages 1300 such that each biocontainer 1200 is associated with a respective sensor 1210 disposed in a package 1300 therewith, the packages 1300 are placed in a container 1100 suitable for irradiation (Step 520). The container 1100 may include a plurality of packages 1300 with each package 1300 having similar biocontainers or different biocontainers. Each of the plurality of packages 1300 in the container 1100 may have one or more sensors 1210 disposed therein.

With the packages 1300 containing the sensors 1210 placed in the container 1100, the container 1100 is subjected to radiation from a radiation source such as radiation source 1020 (Step 540). During delivery of radiation, the sensors 1210 may provide measurements of a radiation dose to a controller outside of the container 1100 (Step 542). The sensor 1210 may provide measurements to the controller in real-time such that measurements of the sensor 1210 can be used to control a duration of exposure to the radiation source 1020. Transmission of signals from the sensor 1210 to the controller outside of the container 1100 may be direct to the controller outside of the container 1100 or to an intermediate antenna, relay, or controller of the container 1100 which then transmits the signal from the sensor 1210 to the controller outside of the container 1100. The intermediate antenna, relay, or controller of the container 1100 may be in communication with multiple sensors, e.g., sensor 1210, within the container 1100 and send a single consolidated signal to the controller outside of the container 1100 including the data of the multiple sensors. The controller outside of the container 1100 may terminate delivery of radiation when all of the sensors within the container 1100, e.g., sensor 1210, are at or above a desired dose of radiation or when one or more sensors within the container 1100 reach a maximum dose of radiation (Step 546). When the desired dose is reached or the maximum dose is reached, delivery of radiation is terminated (Step 548). In some embodiments, the real-time measurements of the sensor 1210 may be taken continuously or at predetermined intervals during delivery of radiation. In certain embodiments, the real-time measurements of the sensor 1210 are taken between cycles of delivery of radiation. Taking the real-time measurements between cycles of delivery of radiation may increase the accuracy of a measurement as a result of a reduction in interference from active gamma irradiation.

After delivery of radiation is completed, the sensor 1210 may provide a radiation dose received during irradiation to determine the total radiation absorbed by the associated biocontainers 1200 during irradiation (Step 550). The radiation dose may be used to determine modification of the material of the associated biocontainers 1200 or the formation of free radicals as a result of the irradiation. With the radiation dose and the material of the biocontainer 1200 known, an ageing time can be calculated to minimize the risk of protein oxidation within the biocontainer 1200 (Step 560). The ageing time may be an amount of time for the material of the associated biocontainer 1200 to stabilize after irradiation as detailed above with respect to FIG. 6. As detailed above, storing the biocontainer(s) 1200 associated with the sensor 1210 until the material of the biocontainers 1200 stabilizes may reduce degradation of products contacting the materials of the biocontainer(s) 1200. The ageing time may be calculated or determined from data gathered from previous tests of similar biocontainers or materials exposed to varying doses of radiation similar to what is shown in FIG. 6. In some embodiments, to calculate an ageing time based on materials and radiation dose may include developing a table or formula for each type or material of the biocontainer of protein oxidation as a function of ageing time and radiation dose. When the ageing time has passed, the package 1300 of biocontainers 1200 may be shipped or placed into use (Step 570).

Figure 8:
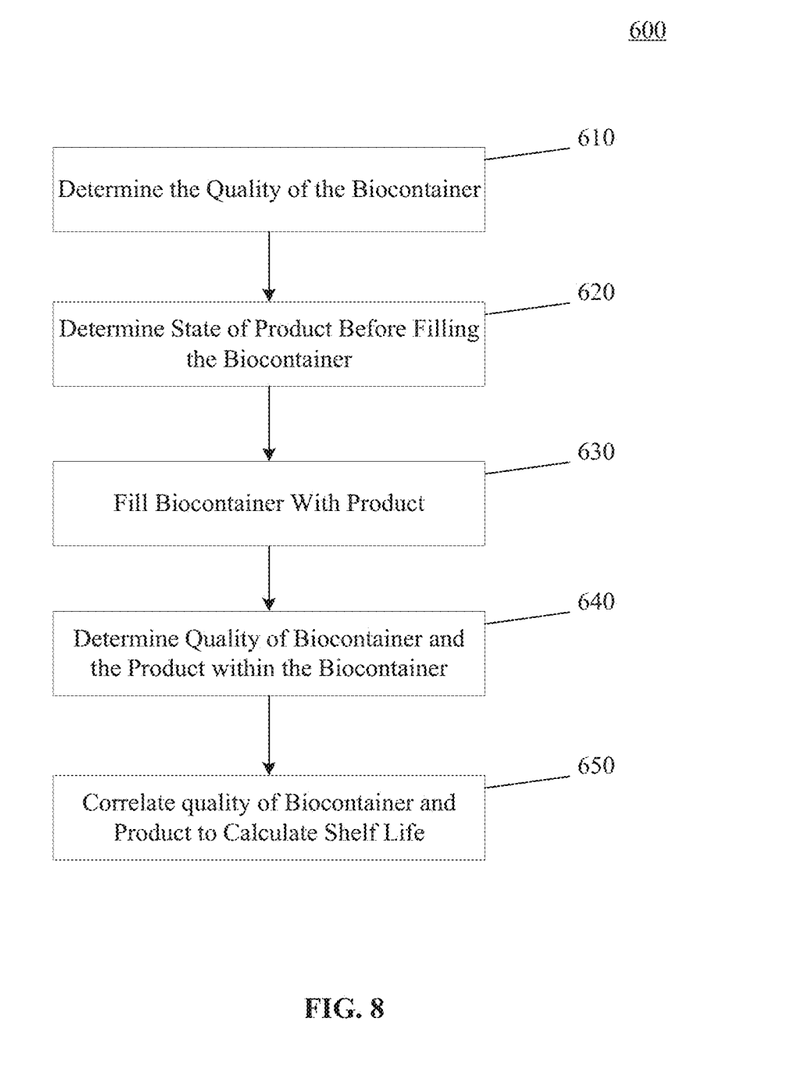
FIG. 8 is a flow chart of a method of determining a shelf life of a product within a biocontainer in accordance with embodiments of the present disclosure.

With reference to FIG. 8, methods of determining properties of a biocontainer 1200 and methods of determining properties of products stored within the biocontainer 1200 are described in accordance with the present disclosure.

As noted above, the dose of radiation received by the biocontainer 1200 during irradiation may affect the performance of the biocontainer 1200. The performance of the biocontainer 1200 may be based on a quality of material forming the biocontainer 1200 after irradiation and/or may be a result of dissipation of free radicals or other particles from the biocontainer 1200. The quality of the material forming the biocontainer 1200 and/or dissipation of free radicles may affect products stored within the biocontainer 1200, e.g., protein oxidation of the products stored within the biocontainer 1200. Continuing to take measurements from the sensor 1210 after the ageing time is complete may allow for the determination or estimation of dissipation of free radicles or other particles from the biocontainer 1200 after the ageing time is complete. This dissipation of free radicles or other particles from the biocontainer 1200 may be used to determine how a product stored within the biocontainer 1200 may be affected.

The quality of the material forming the biocontainer 1200 can be determined from measurements of the senor 1210 taken during and/or after the ageing time. For example, measurements may be taken with the sensor 1210 and correlated to a table or formula for each type of material of the biocontainer as a function different properties measured by the sensor 1210, e.g., capacitance. The table may be developed for each material of a biocontainer such that a particular reading from the sensor 1210 can be correlated to quality of the material forming the biocontainer 1200.

The quality of the biocontainer 1200 may be associated with a life of the biocontainer 1200 after the biocontainer 1200 is filled with a product. This life of the biocontainer 1200 when filled with a product may be referred to as "shelf life" or the amount of time the biocontainer 1200 can be used to store a product in a useable state. The shelf life may be determined based on a quality of the biocontainer 1200 before or after it is filled with the product. In embodiments, a measurement of the sensor 1210 may be taken after the ageing time and before the biocontainer 1200 is filled to determine a shelf life of the biocontainer 1200 once filed with a particular product. In some embodiments, a measurement of the sensor 1210 may be taken after the biocontainer 1200 is filled with a product to determine the shelf life of the biocontainer 1200. In particular embodiments, measurements of the sensor 1210 are taken before and after the biocontainer 1200 is filled with a product to determine the shelf life of the biocontainer 1200. The shelf life may be determined by one or more of the following factors including, but not limited to, properties of the biocontainer 1200, a quality of the biocontainer 1200 as measured by the sensor 1210, a type of product, an amount of product, or a temperature at which the product will be stored in the biocontainer 1200.

The method 600 of determining the shelf life of the bag and the product contained therein may include determining a state or quality of the biocontainer 1200 before the biocontainer 1200 is filled (Step 610), determining a state or quality of the product filling the biocontainer 1200 before the biocontainer 1200 is filled (Step 620), and determining a state or quality of the biocontainer 1200 and the product within the biocontainer 1200 after the biocontainer 1200 is filled with the product (Step 640). The quality of the biocontainer 1200 and the product taken separately before filling may be correlated with the quality of the biocontainer 1200 and the product taken together after filling (Step 630) to determine the shelf life of the biocontainer 1200 when filled with the product (Step 650). The quality of the biocontainer 1200 may be determined by measurements of the sensor 1210 as detailed above. In addition, the quality of the biocontainer 1200 and the product once the biocontainer 200 is filled with the product may be determined by measurements of the sensor 1210. For example, properties of the sensor 1210, e.g., capacitance, may be used to determine a quality of the biocontainer 1200 and the product contained within the biocontainer 1200.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of measuring a radiation dosage, the method comprising:
    disposing a first sensor in a first package with a first empty biocontainer;
    disposing a second sensor in a second package with a second empty biocontainer;
    placing the first package and the second package in a container;
    irradiating the container including the first package and the second package; and
    measuring a first radiation dosage associated with the first empty biocontainer with the first sensor and a second radiation dosage associated with the second empty biocontainer with the second sensor.

2. The method according to claim 1, wherein measuring the first radiation dosage and the second radiation dosage includes the first radiation dosage being different from the second radiation dosage.

3. The method according to claim 1, wherein disposing the first sensor in a first package includes disposing the first sensor in the first package with the first empty biocontainer and a third empty biocontainer such that the first sensor is associated with the first empty biocontainer and the third empty biocontainer.

4. The method according to claim 1, wherein placing the first package and the second package in a container includes placing the first package and the second package on a pallet.

5. The method according to claim 1, wherein irradiating the container including the first package and the second package comprises exposing the container to a first cycle of radiation and a second cycle of radiation, and wherein measuring the first radiation dosage occurs between the first cycle of radiation and the second cycle of radiation.

6. The method according to claim 1, further comprising filling the second empty biocontainer with a product after an ageing time at least partially based on the second radiation dosage.

7. The method according to claim 6, further comprising calculating the ageing time based at least partially on the second radiation dosage after measuring the second radiation dosage and before filling the second empty biocontainer.

8. The method according to claim 1, wherein disposing the first sensor in the first package includes the first sensor having:
    a first electrode having a plurality of first fingers;
    a second electrode having a plurality of second fingers, the plurality of first fingers extending from the first electrode towards the second electrode, the plurality of second fingers extending from the second electrode towards the first electrode such that the first fingers are interdigitated with the second fingers with gaps defined between the first and second fingers; and
    a film coating the plurality of first fingers and the plurality of second fingers such that the film is disposed within the gaps, the film formed of a second material similar to the first material forming the first empty biocontainer.

9. A method of measuring a radiation dosage, the method comprising:
    placing a plurality of packages in a container with each package of the plurality of packages including a sensor associated with an empty biocontainer disposed within the package;
    irradiating the container including the plurality of packages; and
    measuring a radiation dosage of each package with the sensor associated with the empty biocontainer disposed within the respective package.

10. The method according to claim 9, wherein placing the plurality of packages in the container includes placing the plurality of packages on a pallet.

11. The method according to claim 9, wherein placing the plurality of packages in the container including the sensor associated with the empty biocontainer includes at least one package of the plurality of packages comprising a first sensor associated with a first empty biocontainer and a second sensor associated with a second empty biocontainer.

12. The method according to claim 9, wherein placing the plurality of packages in the container including the sensor associated with the empty biocontainer includes at least one package of the plurality of packages including the sensor associated with a first empty biocontainer and a second empty biocontainer disposed within the at least one package.

13. The method according to claim 9, wherein irradiating the container including the plurality of packages comprises exposing the container to a first cycle of radiation and a second cycle of radiation, and wherein measuring the radiation dosage occurs between the first cycle of radiation and the second cycle of radiation.

14. The method according to claim 9, further comprising filling the empty biocontainer with a product after an ageing time at least partially based on the radiation dosage.

15. The method according to claim 14, further comprising calculating the ageing time based at least partially on the radiation dosage after measuring the radiation dosage and before filling the empty biocontainer.

16. The method according to claim 9, wherein placing the plurality of packages in the container includes the first sensor having:
- a first electrode having a plurality of first fingers;
- a second electrode having a plurality of second fingers, the plurality of first fingers extending from the first electrode towards the second electrode, the plurality of second fingers extending from the second electrode towards the first electrode such that the first fingers are interdigitated with the second fingers with gaps defined between the first and second fingers; and
- a film coating the plurality of first fingers and the plurality of second fingers such that the film is disposed within the gaps, the film formed of a second material similar to the first material forming the first empty biocontainer.

17. The method according to claim 16, wherein measuring the radiation dosage of each package with the sensor includes measuring an electrical property through the film.

18. A method of measuring a radiation dosage, the method comprising:
- disposing a first sensor in a first package with a first empty biocontainer;
- disposing a second sensor in a second package with a second empty biocontainer;
- placing the first package and the second package in a container;
- irradiating the container including the first package and the second package;
- measuring a first radiation dosage associated with the first empty biocontainer with the first sensor and a second radiation dosage associated with the second empty biocontainer with the second sensor; and
- filling the first empty biocontainer with a product after an ageing time at least partially based on the first radiation dosage.

19. The method according to claim 18, further comprising calculating the ageing time based at least partially on the first radiation dosage after measuring the first radiation dosage and before filling the first empty biocontainer.

20. The method according to claim 19, wherein disposing the first sensor in the first package includes the first sensor having:
- a first electrode having a plurality of first fingers;
- a second electrode having a plurality of second fingers, the plurality of first fingers extending from the first electrode towards the second electrode, the plurality of second fingers extending from the second electrode towards the first electrode such that the first fingers are interdigitated with the second fingers with gaps defined between the first and second fingers; and
- a film coating the plurality of first fingers and the plurality of second fingers such that the film is disposed within the gaps, the film formed of a second material similar to the first material forming the first empty biocontainer.

* * * * *